United States Patent

Yoshioka et al.

Patent Number: 5,461,357
Date of Patent: Oct. 24, 1995

[54] OBSTACLE DETECTION DEVICE FOR VEHICLE

[75] Inventors: Tohru Yoshioka; Ayumu Doi; Satoshi Morioka; Satoru Matsuoka, all of Hiroshima, Japan

[73] Assignee: Mazda Motor Corporation, Hiroshima, Japan

[21] Appl. No.: 10,090

[22] Filed: Jan. 27, 1993

[30] Foreign Application Priority Data

Jan. 29, 1992 [JP] Japan .................................... 4-013981
Jan. 29, 1992 [JP] Japan .................................... 4-013986

[51] Int. Cl.⁶ ............................. B60Q 1/00; G08G 1/16
[52] U.S. Cl. ........................ 340/435; 340/903; 340/901; 340/555; 348/135; 348/148; 348/169; 180/167; 180/169
[58] Field of Search .................... 340/435, 436, 340/903, 904, 905, 901, 555–557; 348/135, 118, 119, 169, 148; 180/167, 169, 271, 274, 275; 356/1, 141, 152, 141.4, 152.2; 250/560, 561

[56] References Cited

U.S. PATENT DOCUMENTS

| 5,087,969 | 2/1992 | Kamada et al. | 348/119 |
| 5,101,351 | 3/1992 | Hattori | 180/167 |
| 5,109,345 | 4/1992 | Dabney et al. | 348/119 |
| 5,128,874 | 7/1992 | Bhanu et al. | 348/119 |
| 5,166,681 | 11/1992 | Bottesch et al. | 340/903 |
| 5,177,462 | 1/1993 | Kajiwara | 340/903 |

FOREIGN PATENT DOCUMENTS

| 3001621 | 7/1980 | Germany . |
| 3222263 | 2/1983 | Germany . |
| 2623643 | 11/1986 | Germany . |
| 3616930 | 6/1989 | Germany . |
| 2-287180 | 11/1990 | Japan . |
| 3-6472 | 1/1991 | Japan . |
| 3-14477 | 2/1991 | Japan . |

Primary Examiner—Donnie L. Crosland
Attorney, Agent, or Firm—Keck, Mahin & Cate

[57] ABSTRACT

An obstacle detection device for a vehicle includes an area determining section for determining a detection area extended forward of a running vehicle and provided for detecting an obstacle, a split section for splitting the area into a plurality of small split zones, a detecting section for detecting an obstacle in each of the small split zones, inferring section for an inferring a path of the vehicle in the obstacle detection area, and a judging section for judging a rank of danger of an obstacle in the detection area. The obstacle can be properly detected so that the vehicle can take a responsive and appropriate action for avoiding the obstacle.

16 Claims, 15 Drawing Sheets

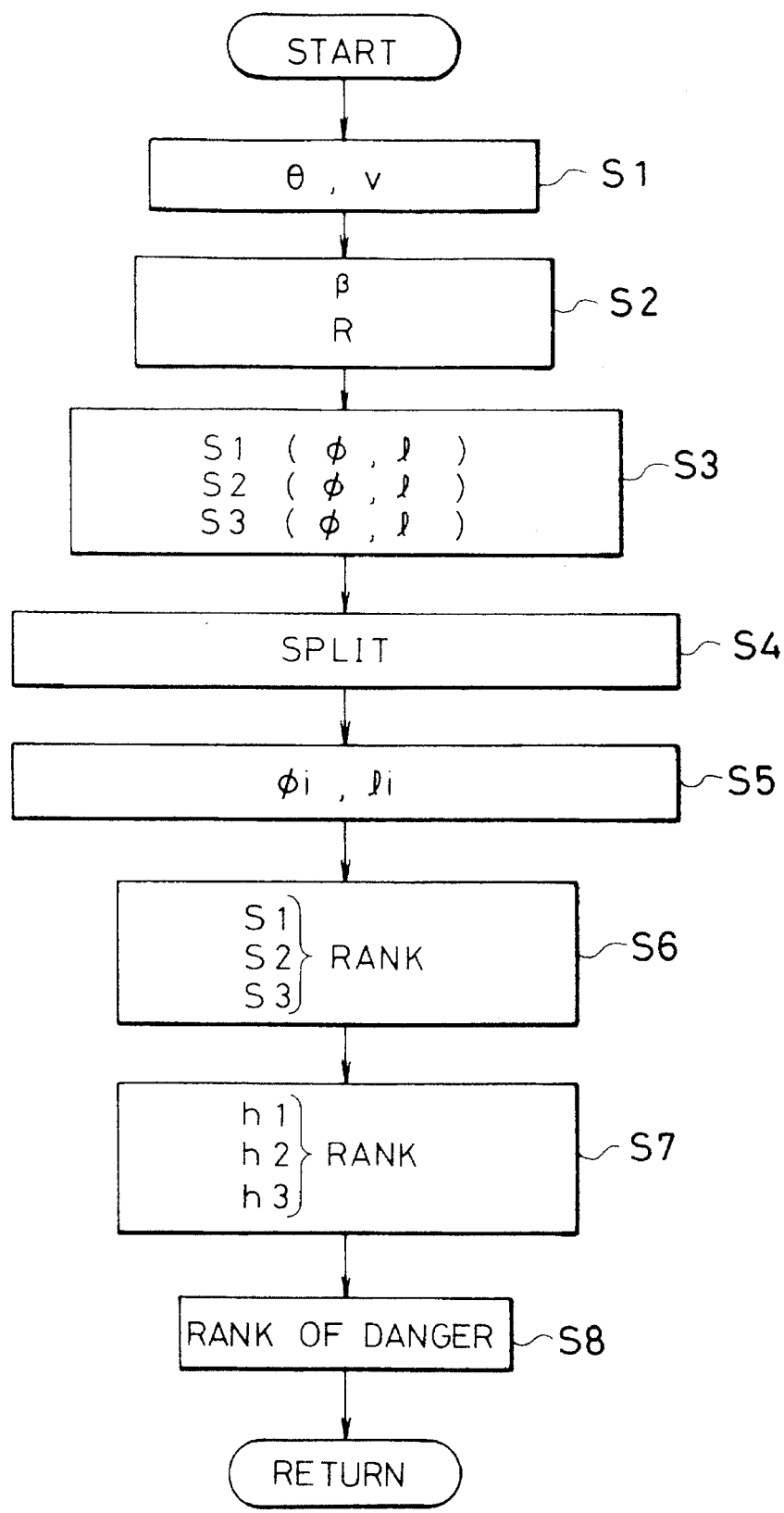

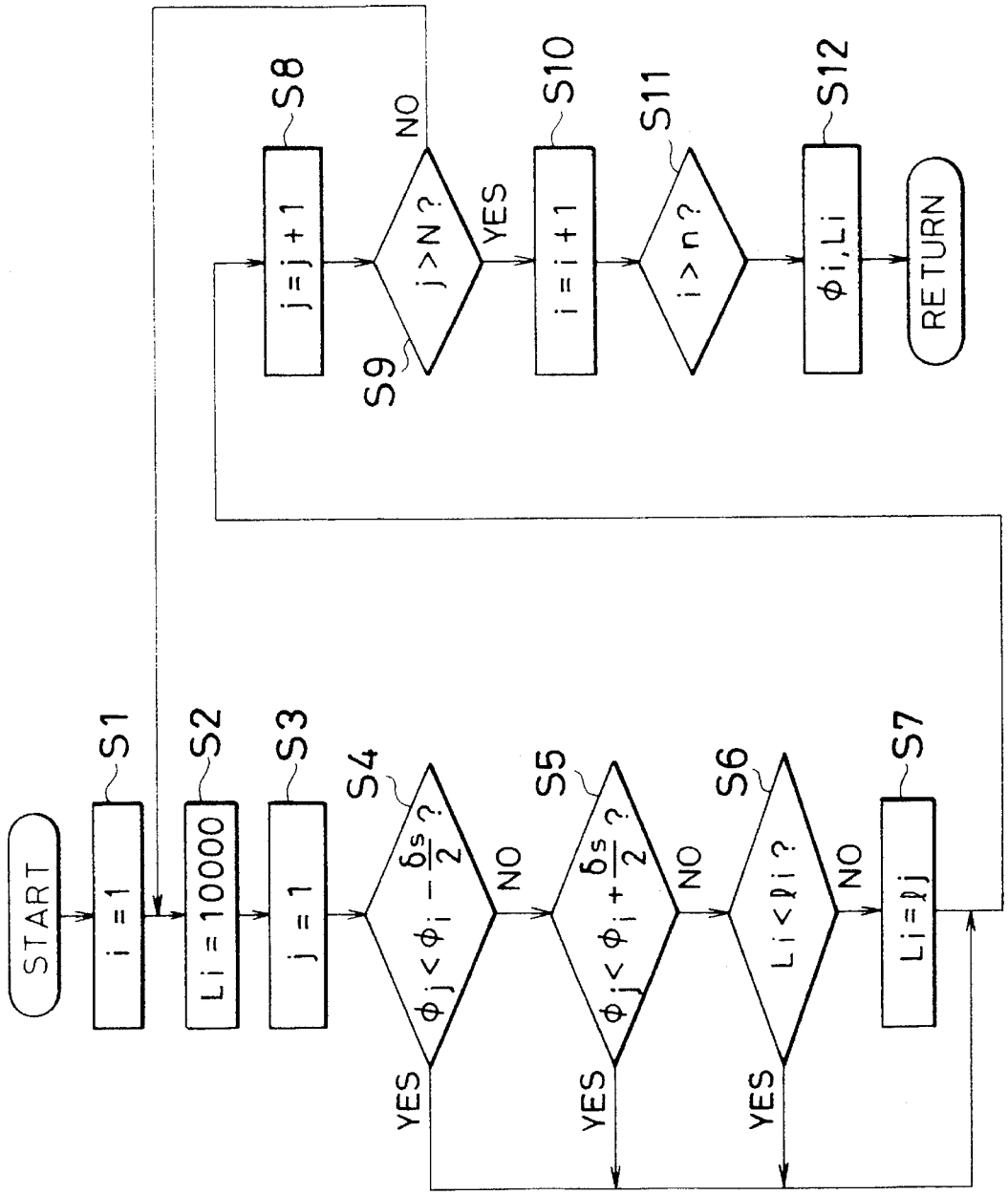

FIG.9

|  | S 1 | S 2 | S 3 |
|---|---|---|---|
| h 1 | — | — | — |
| h 2 | SLOW BRAKE | ALARM | — |
| h 3 | QUICK BRAKE | SLOW BRAKE | ALARM |

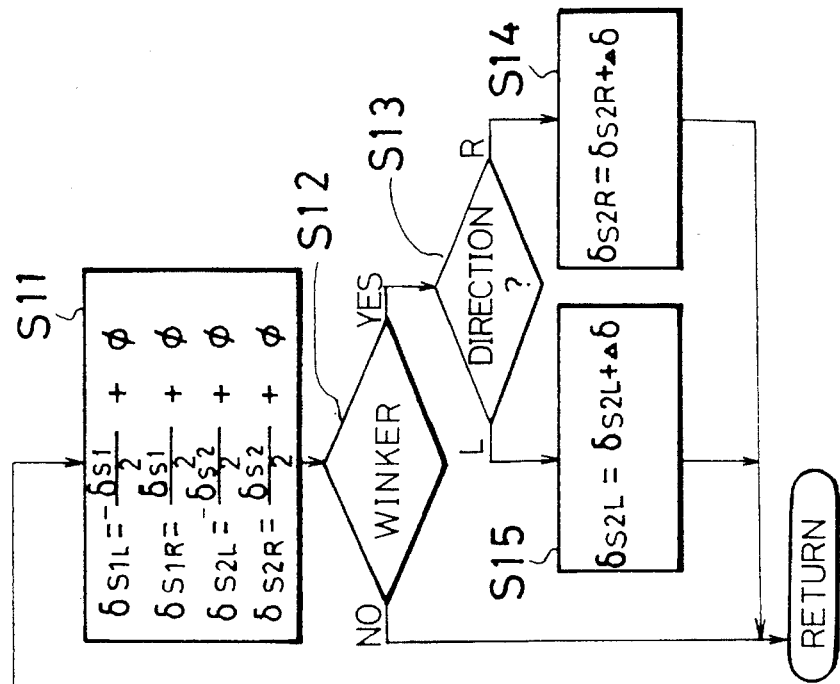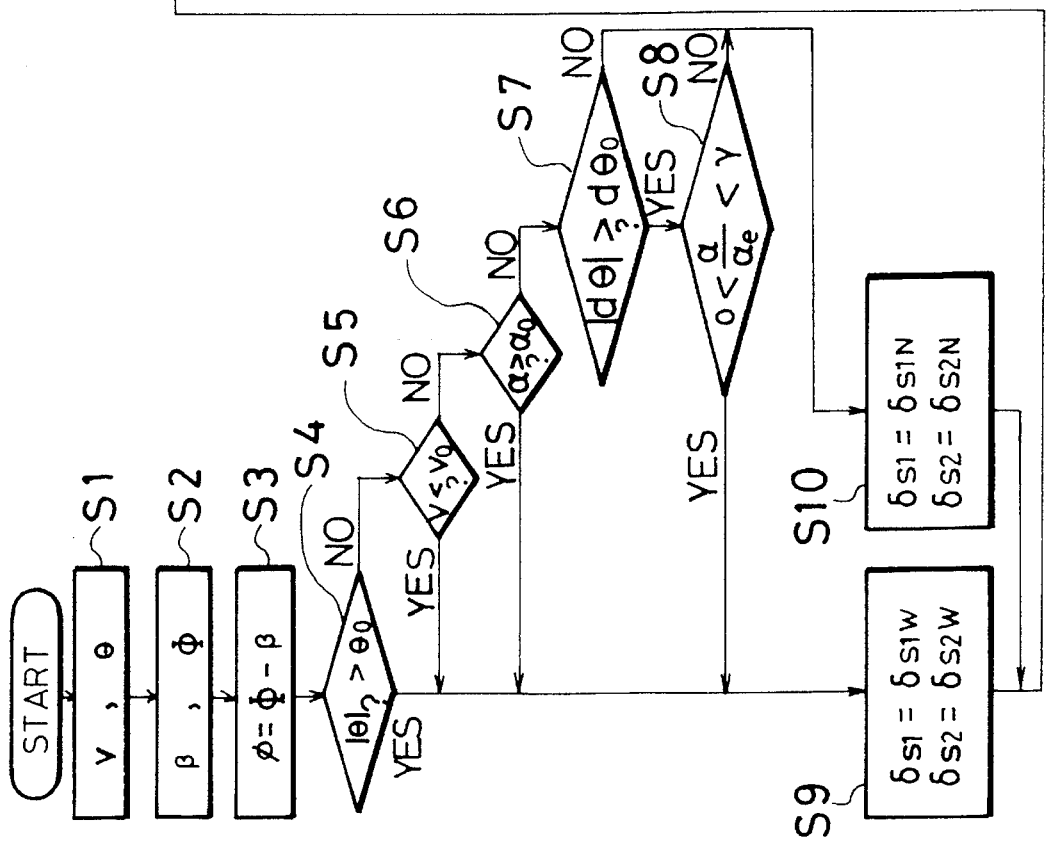
FIG.13

OBSTACLE DETECTION DEVICE FOR VEHICLE

BACKGROUND OF THE INVENTION

1. Field of the Invention

The present invention relates to a device for detecting an obstacle on a path forward of a running vehicle.

2. Description of the Prior Art

An obstacle detection device has been known that scans a specific area extended forward of a running vehicle to detect an obstacle. Such a device is disclosed in Japanese Patent Publication No. 3-6472, published for opposition in 1990.

In such an obstacle detection device, if a plurality of obstacles are detected within the specific area, it is necessary to assess how dangerous each of the obstacles is so that a vehicle control, such as production of an alarm, a braking control and steering control for avoiding the obstacles can be made afterward.

If the obstacle is moving in the specific area, a rank of danger changes. Therefore, it is necessary to trace the moving obstacle in order to make a proper assessment. However, a conventional device cannot satisfy this requirement.

Japanese Patent Public Disclosure No. 2-287180, laid open to the public in 1990, discloses a device for switching a direction of a radiation beam for detecting an obstacle in accordance with a moving direction of the vehicle in a turning action.

However, the conventional device detects installations by the road, such as a guardrail or a sign pole, as an obstacle so that a control for avoiding a true obstacle is confused.

SUMMARY OF THE INVENTION

It is therefore an object of the present invention to provide an obstacle detection device which can properly assess a rank of danger of a plurality of obstacles appearing in a specific area extended forward of a running vehicle.

It is another object of the present invention to properly assess a moving obstacle in the specific area.

It is further object of the present invention to provide an obstacle detection device which can properly and precisely detect the obstacle.

The above and other objects of the present invention can be accomplished by an obstacle detection device for a vehicle comprising area determining means for determining an obstacle detection area extended forward of a running vehicle in order to detect an obstacle which may interfere with the vehicle, split means for splitting the area into a plurality of small split zones, detecting means for detecting an obstacle in each of the small split zones, inferring means for inferring a path of the vehicle in the obstacle detection area, and judging means for judging a rank of danger of an obstacle in the obstacle detection area.

In a preferred embodiment, the device further comprises ranking means for ranking the obstacles detected and the split zones. The judging means judges the rank of the danger of each of the obstacles based on the ranks of both the obstacle and the small split zone where the obstacle belongs to. A control means is provided for the vehicle based on the judgment of the Judging means. Preferably, adjacent small split zones are partly overlapped with each other.

Typically, the detecting means is constituted by a single scanning laser sensor. The area determining means determines the obstacle detection area within the scanning area of the laser sensor in processing a signal from the laser sensor. The split means splits the detection area into plural small split zones.

According to the feature of the present invention, as aforementioned, the obstacle detection area is split into a plurality of small split zones which are ranked respectively. For example, if one small split zone is on an inferred vehicle path, the rank of danger is high. As the small split zone offsets from the inferred vehicle path, the rank of danger is lowered. As the small split zone is away from the running vehicle, the rank of danger is lowered. The obstacle in the small split zone is also ranked. An obstacle close to the vehicle, one coming toward the vehicle and the like are ranked as a high rank of danger. On the other hand, an obstacle distant from the vehicle, one going away and the like are ranked as a low rank of danger. Thus, even when a plurality of obstacles exist in the detection area, the obstacles are properly ranked to be assessed so that a proper control for avoiding the obstacle can be synthetically and efficiently established. According to the present invention, the adjacent small split zones are provided to have an overlapped portion with each other so that if an obstacle is in the overlapped portion, the obstacle is monitored and assessed through both small split zones. As a result, even when a moving obstacle comes into the detection area, the sudden appearance of an obstacle in a small split zone of a high rank of danger can be prevented. There is no need to take a quick action for avoiding the obstacle. The detection area and small split zone are provided hypothetically for data processing. There is no fear of complicating the structure of the device.

In another aspect of the invention, the device comprises excluding means for excluding data concerning a detected obstacle located in a predetermined part of the detection area.

The device may comprise distance detecting means for detecting a distance between the vehicle and an installation by a road or such as a guardrail, sign pole. The predetermined part is determined in accordance with the distance. As another example, a lane opposite to a running lane of the vehicle is designated as the predetermined part when the vehicle runs on a substantially straight path. When the vehicle runs on a curved path, an area beyond an outer edge of the path in a radial direction of a turning action is designated as the predetermined part. Thus, the obstacle can be detected properly, excluding the installation by the road and a object beyond the installation, since the guardrail and the sign pole do not form obstacles to the vehicle.

Further objects, features and advantages of the present invention will become apparent from the Detailed Description of Preferred Embodiments which follows when read in light of the accompanying Figures.

BRIEF DESCRIPTION OF THE DRAWINGS

FIG. 4 is a flowchart of a detecting procedure of an obstacle;

FIG. 6 is a flow chart of an obstacle detecting procedure;

FIG. 9 is a table for assessing a rank of danger of the obstacle;

FIG. 13 is a flow chart of a routine for changing a size of a specific split zone in accordance with a driving condition of the vehicle;

DETAILED DESCRIPTION OF THE PREFERRED EMBODIMENTS

Hereinafter, a preferred embodiment of the present invention will be explained taking reference with the drawings.

Figure 1:
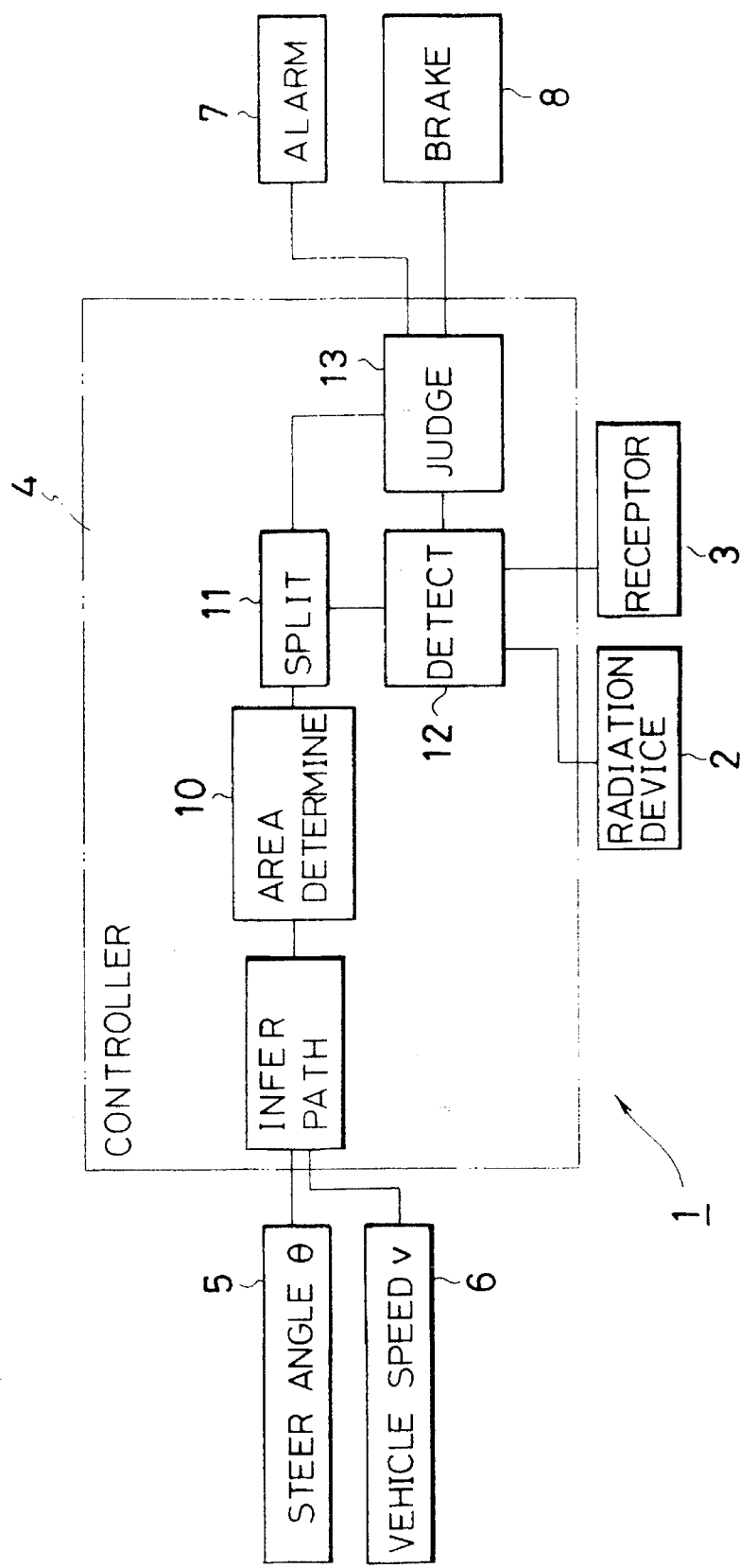
FIG. 1 is a block diagram of an obstacle detection device in accordance with the present invention.

FIG. 1 shows a schematic view of an obstacle detection device in accordance with the present invention. The detection device 1 is provided with radiation device 2 for producing a laser provided on a front portion of a vehicle and a receptor 3 for receiving reflection light from the radiation device 2. The radiation device 2 and the receptor 3 are connected with a controller 4 which controls them. The controller 4 receives a signal from a steering angle sensor 5 for detecting a steering angle θ of the vehicle and a signal from a vehicle speed sensor 6 for detecting a vehicle speed v. The controller 4 judges a rank of danger of an obstacle detected based on signals various sensors including the steering angle sensor 5 and vehicle speed sensor 6 to produce a control signal to alarm device 7 and automatic braking device 8 for avoiding the obstacle.

The controller 4 preferably includes a microprocessor to execute a program and to accomplish a predetermined objective. The controller 4 can be seen functionally to have the following sections. Namely, the controller 4 is provided with inferring section 10 for inferring the path of the vehicle based on the signals from the steering angle sensor 5 and the vehicle speed sensor 6, a determining section for determining a detection area 10 for detecting an obstacle which may hinder running of the vehicle, splitting section 11 for splitting the detection area into a plurality of small split zones, detecting section 12 for detecting one or more obstacles for each of the split zones based on signals from a radiation device 2 and a receptor 3, and judging section 13 for ranking danger of the split zones taking account of the path of the vehicle and danger of the obstacles in accordance with the location and movement thereof so as to judge synthetically the danger of the obstacles.

Figure 2:
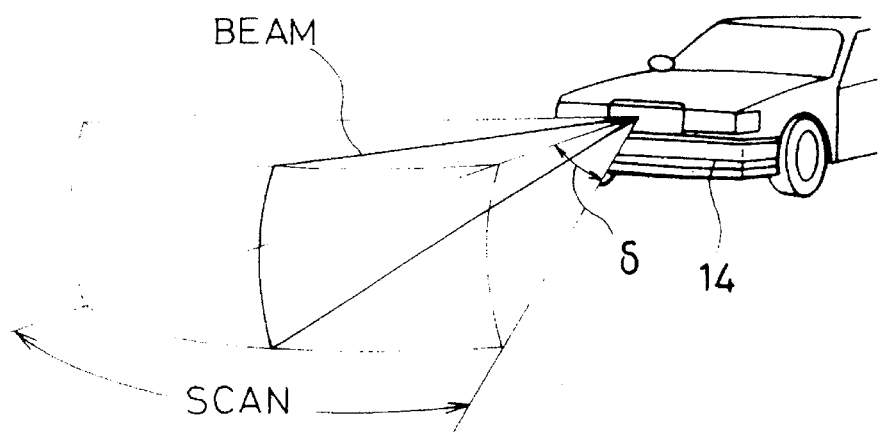
FIG. 2 is a schematic perspective view of a scan area for the obstacle.
Figure 3:
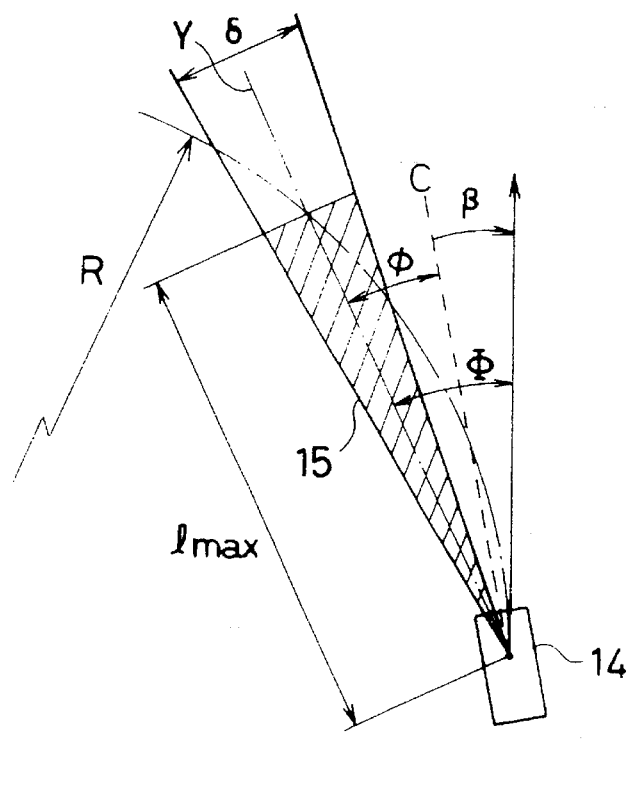
FIG. 3 is a plan view showing a detection area.

The radiation device, as illustrated in FIG. 2, is provided at a front portion of the vehicle 14 and is a scanning laser which scans a sector area of an expansion angle δ with a sector beam. The angle δ is determined so that a width of the area is 2 m at a point of 10 m ahead of the vehicle and 20 m at a point of 100 m ahead of the vehicle 14. The receptor 3 is a scanning sensor which receives a reflected light from an obstacle which is irradiated by the scanning laser. The detecting portion 10 calculates a distance between the vehicle and the obstacle based on a time period from the radiation device to the receptor. The obstacle to the vehicle is detected basically on an area shown by a hatched area S in FIG. 3. In FIG. 3, references v, θ, δ, β, R, $l_{max}$ are a vehicle speed, steering angle, expansion angle of the detection area, side slip angle of the vehicle body, turning radius of the vehicle and maximum distance for detecting the obstacle, respectively. Meanwhile, the side slip angle β, and turning radius R is provided by the following equations.

$$\beta = (-1 + (m/2s)(s_f/s_r K_r)v^2)/(1+Av^2)(s_r/s)(\theta/N) \quad (1)$$

$$R = (1+A^2)s(N/\theta) \quad (2)$$

Wherein

A: stability factor $(m/2s^2)(s_r K_r - s_f K_f)/K_f K_r$ $(s^2/m^2)$ s: wheel base (m)

N: steering gear ratio (–)

m: vehicle weight (kg)

$s_f$: distance from a gravity center of the vehicle to a front wheel (m)

$s_r$: a distance from the gravity center of the vehicle to the rear wheels (m)

$K_r$: cornering power of a rear wheel tire (N/radian)

$K_f$: cornering power of a front wheel tire (N/radian)

The maximum detection distance $l_{max}$ is a maximum distance in which the vehicle detects the obstacle and can stop without hitting the obstacle. Thus, the maximum detection distance $l_{max}$ can be expressed by the following equation.

$$l_{max} = v^2/2\mu$$

μ: friction coefficient (–)

g: gravity acceleration (m/s²)

Next, a control for judgment of a rank of danger of the obstacle and for avoiding the obstacle will be explained hereinafter.

Referring to FIG. 4, there is shown a flow chart of the control. The controller 4, first of all, detects the steering angle θ and vehicle speed through the steering angle sensor 5 and vehicle speed sensor 6 (step 1). Then, the controller 4 speculates the side slip angle β and the turning radius R (step 2). Next, the controller 4 speculates a path of the vehicle 14 (step 3). Thereafter, the controller sets up a detection area for detecting an obstacle within the area scanned by the laser, splits the area into a plurality of small split zones and ranks the split zones with regard to a degree of danger. In the illustrated embodiment, the area is split into a collision zone S1 where the vehicle is highly likely to collide with the obstacle therein, a close zone S2 where the vehicle is not likely to collide with the obstacle therein but likely in on close to the obstacle, and an alert zone where the obstacle therein is not so highly dangerous but had better be watched out for the time being. Each of the split zones is specified by an expansion angle δ around a center axis of the split zone offset by an offset angle φ from a center of the path of the vehicle and a distance L from the vehicle.

Figure 5:
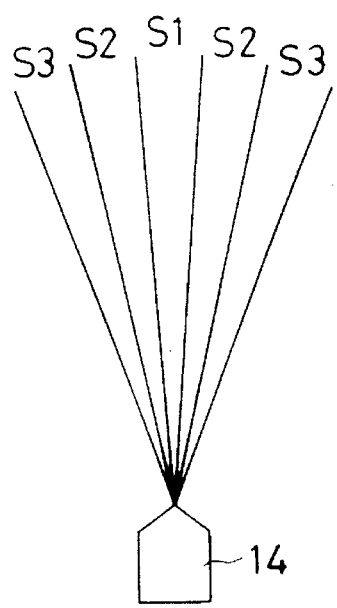
FIG. 5 is a schematic view of split zones in the detection area.

In FIG. 5, ranked split zones are shown schematically. As shown in FIG. 5, the offset angle φ is increased for the collision zone S1, the close zone S2 and the alert zone S3 in this order. This means that as the offset from the path of the vehicle is increased, the rank of danger of the split zone is lowered. In step 4, the controller splits the detection area into a plurality of the small split zones. The procedure is the same as that of the ranking of the detection area as aforementioned. Thus, the split zone is defined by the offset angle φ and the expansion angle δ. The expansion angle δ can be changed in accordance with a driving condition. Although each of the small split zones can be the same expansion angle δ, it is possible to provide different expansion angles δ for the small split zones. Further, it is possible to provide an overlapped portion for the adjacent small split zones. The overlapped portion may be changed in size in accordance with the driving condition so that the detection of the obstacle can be facilitated.

In next step, the controller 4 detects the obstacle within the detection area. In this case, the controller 4 detects the direction $\phi_j$ and distance $l_j$. The controller 4 selects the closest obstacle to the vehicle among plural obstacles ($\phi_{ij}$, $l_{ij}$) in the small split zone $S_i$ in step 5. Referring to FIG. 6, the procedure for finding the closest obstacle of the number N of the obstacles is explained in the small split zone $S_i$.

In FIG. 6, the controller 4 provides the parameter i which identifies the small split zone S with a value 1 in step 1. Next, the controller 4 sets the initial value for the minimum distance $L_i$ of the obstacle in the small split zones $S_i$ at a relatively large value, such as 10000 (step 2). Then, the controller 4 sets an initial value of a parameter j for identifying the detected obstacle at a value 1. The controller 4 judges whether or not the obstacle is in the small split zone $S_i$ in light of an angular location $\phi_j$ (step 4, 5). If the obstacle is in the small split zone $S_i$ under consideration, the controller 4 judges whether or not the distance $l_j$ of the obstacle is smaller than the predetermined value $L_i$ (10000 in this embodiment). If the value $l_j$ is smaller than the value $L_i$, the controller 4 renews the value of $L_i$ (step 6). Then, the controller 4 renews the value of the parameter j to check up the next data representative of the obstacle (steps 7, 8). When the controller 4 checks all the obstacles in the small split zone $S_i$, the controller 4 renews the value of the parameter i for the small split zone. Then, the controller 4 selects the closest obstacle with the same procedure in the next small split zone (step 9, 10). The controller 4 repeats the above procedures to select the number n of the closest obstacle ($\phi_i$, $L_i$) for each small split zone $S_i$ (step 11).

Figure 7:
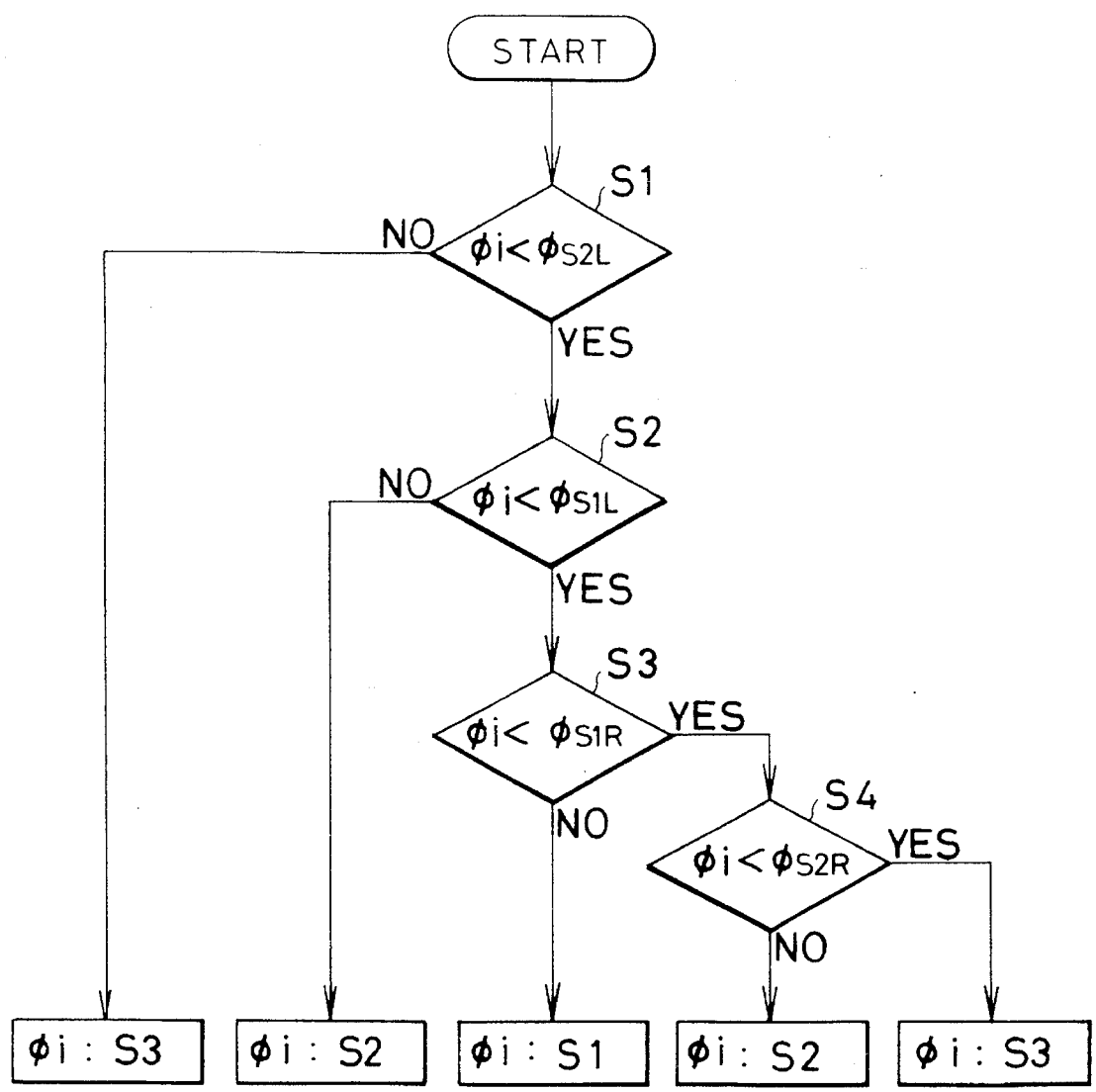
FIG. 7 is a flow chart of a routine for assessment of the obstacle.

In the procedure in step 6 of FIG. 4, the controller 4 executes a subroutine of FIG. 7 and judges which split zone the obstacle belongs to among the collision zone S1, close zone S2 and alert zone S3.

First of all, the controller 4 judges whether or not the obstacle is outside the left boundary of the close zone S2 in FIG. 5 in light of the direction $\phi_i$ of the obstacle.

If this judgment is yes, namely, if the obstacle is outside of the left boundary of the close zone S2, the obstacle is in the alert zone S3. If the judgment is no, or if the obstacle is inside the left boundary of the close zone S2, the controller 4 further judges whether or not the obstacle is outside the left boundary of the collision zone (step 2). If the obstacle is outside of the left boundary of the collision zone S1, the obstacle is in the close zone S2. If the obstacle is inside the left boundary of the collision zone S1, the controller 4 further judges whether or not the obstacle is inside the right boundary of the collision zone (step 3). If the obstacle is outside the right boundary of the collision zone S1, the obstacle is in the collision zone S1. If the obstacle is outside of the collision zone S1, the controller 4 further judges whether or not the obstacle is inside the right boundary of the close zone S2 (step 4). If the judgment is yes, the obstacle is in the close zone S2. If no, the controller 4 finds the obstacle is in the alert zone S3.

Figure 8:
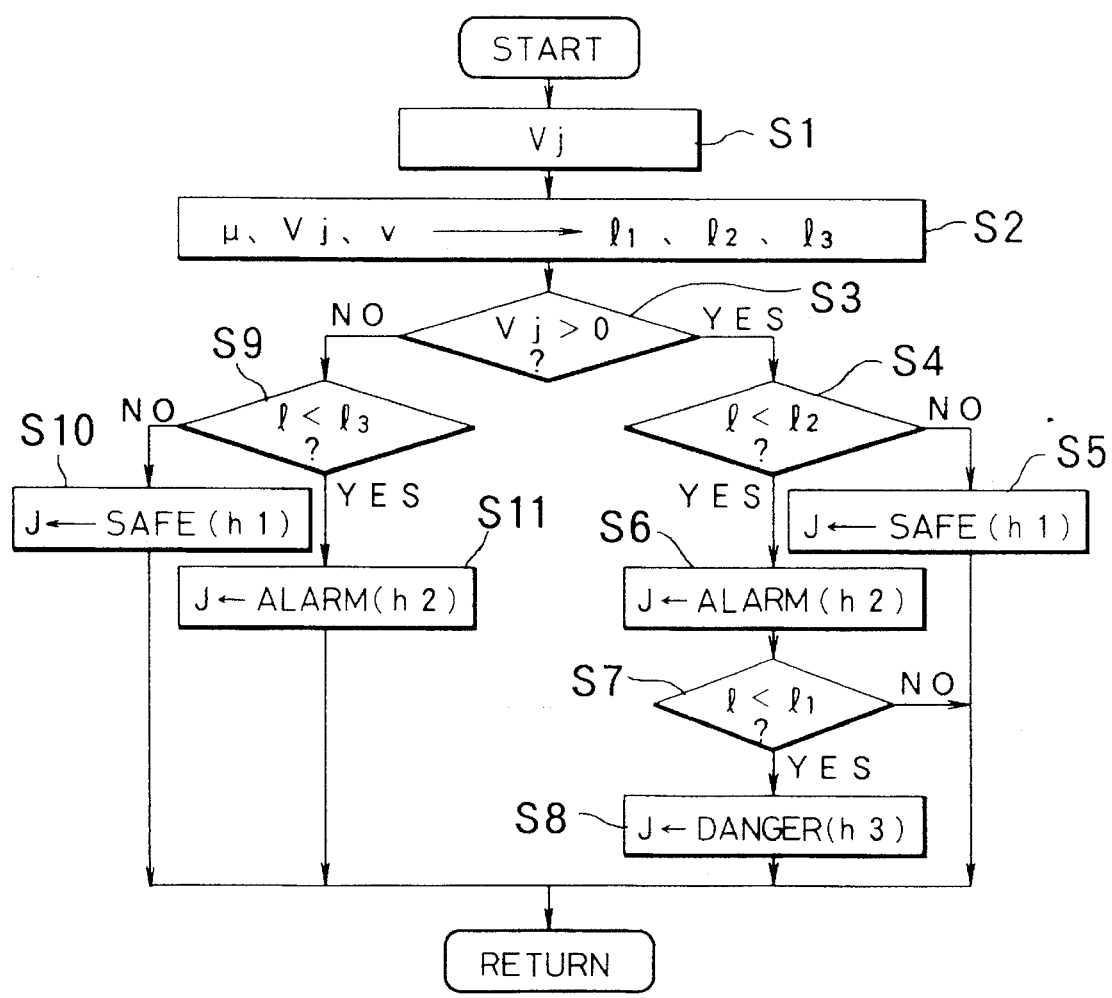
FIG. 8 is a flow chart of a ranking procedure of the obstacle detected.

Next, the controller 4 executes a danger judgment routine shown in FIG. 8 which covers a step 7 in FIG. 4 to judge a rank of danger of the obstacle in the detection area.

In FIG. 8, the controller 4 calculates a relative speed $V_j$ of the obstacle to the vehicle 14 based on a change in the distance $l_j$ (step 1). Next, the controller 4 sets threshold values $l_1$, $l_2$ and $l_3$ for judging the rank of the danger of the obstacle based on a road friction coefficient μ, the relative speed $V_j$ and vehicle speed v (step 2). In this case, the values $l_1$, $l_2$ and $l_3$ are provided as $l_1 < l_2 < l_3$. Next, the controller 4 judges whether or not the relative speed $V_j$ is positive, namely, the controller 4 judges whether or not the vehicle is running close to the object φ (step 3). If the relative speed $V_j$ is positive and the vehicle 14 is running toward the object φ, the controller 4 judges whether or not the distance l of the object φ is smaller than the threshold $l_2$ (step 4). If this judgment is No, namely, if the distance of the object φ is greater than the threshold $l_2$, the controller 4 holds that the vehicle 14 is in a safe range and set a safety judgment flag J at a value h1 (step 5). If the judgment in step 4 is yes, namely if the object φ is getting closer to the vehicle 14 beyond the threshold $l_2$, the controller 4 holds the object φ is in an alarm range where the rank of the danger of the obstacle is not so high as a danger range but necessary to alarm. In this case the controller 4 sets the flag J at a value h2 (step 6). Next, the controller 4 further judges whether or not the distance l of the object φ is smaller than the threshold $l_1$ (step 7). If the judgment is No, or if the distance l of the object φ is greater than the threshold $l_1$, no further action is taken even though the object φ is getting closer to the vehicle 14. However, if the judgment in step 7 is Yes and the object φ is getting closer to the vehicle 14 beyond the threshold $l_1$, the controller 4 holds the object φ is in the danger range where the rank of danger is so high that an automatic control, such as an automatic braking action is to be taken. In this case, the controller 4 sets the flag at a value h3.

In step 3 of the routine in FIG. 8, if the judgment is No, or if the relative speed $V_j$ is negative, the controller 4 further judges whether or not the distance l of the object φ is smaller than the threshold $l_3$ (step 9). If this judgment is No, the controller 4 holds the obstacle is in the safe range and sets the flag J at a value 0 (step 10). If the judgment is Yes in step 9 and even if the object φ is getting away from the vehicle 14, the controller 4 sets the flag J at a value 1 to call the driver attention (step 11). As shown in FIG. 9, the controller 4 makes a synthetic judgment for avoiding the danger in accordance with a flow chart in FIG. 9. In fact, the controller 4 determines how to control the vehicle 14 in light of the distance and movement (h1, h2 and h3) of the obstacle or object φ and the zone (S1, S2 and S3) where the object φ is located. For example, if the object φ is in the collision zone S1 and the danger range h1, the rank of the danger is very high so that the controller 4 produces a command to make a quick braking action. If the object φ is in the collision zone S1 but in the safe range h1, the rank of the ranger is not so high so that the controller 4 does not take an action for avoiding the danger. According to the aforementioned control, the rank of the danger of the obstacle φ can be properly assessed. Thus, a sophisticated measure can be taken for avoiding the obstacle φ.

Meanwhile, the size of the small split zone can be changed in accordance with the driving condition of the vehicle to improve the measure for avoiding the obstacle.

Next, it is explained that the overlapped portion of the small split zone is changed in accordance with the driving condition of the vehicle. The expansion angle $\delta_i$ of the small split zone $S_i$ can be obtained through the following formula.

$$\delta_i = (\delta_{max}/n) + \delta_0$$

Wherein $\delta_{max}$: the expansion angle of a whole detection area n: split number of the detection area $\delta_0$: overlapped angle.

Figure 10:
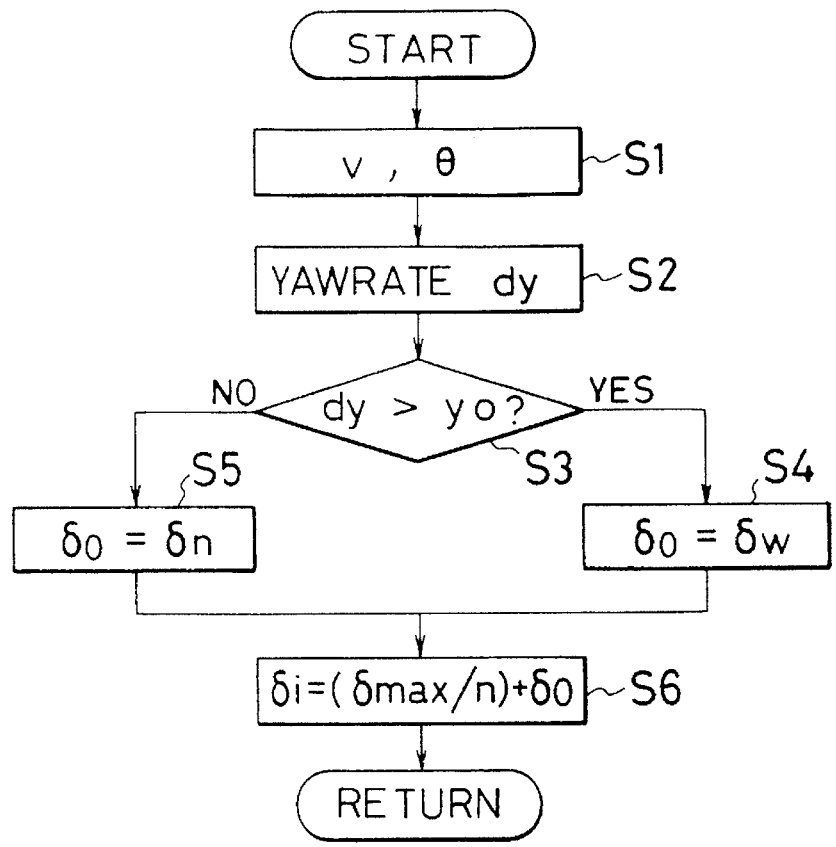
FIG. 10 is a flow chart of a routine changing a size of split zone in accordance with a yawing rate.

Referring to FIG. 10, there is shown a flow chart of the control for changing the size of the overlapped portion in accordance with the driving condition.

The controller 4 calculates a yawing rate dy based on the vehicle speed v and the steering angle θ (steps 1 and 2). If the yawing rate dy is greater than the predetermined value $y_0$, the controller 4 holds that the driving condition of the vehicle is not stable and provides the overlapped angle $\delta_o$ with a larger one $\delta_w$ (steps 3 and 4). If the yawing rate dφ is not greater than the value $y_0$, the controller 4 provides the overlapped angle $\delta_o$ with a normal one $\delta_n$ to determine the expansion angle $\delta_o$ (steps 3, 5 and 6).

Figure 11A:
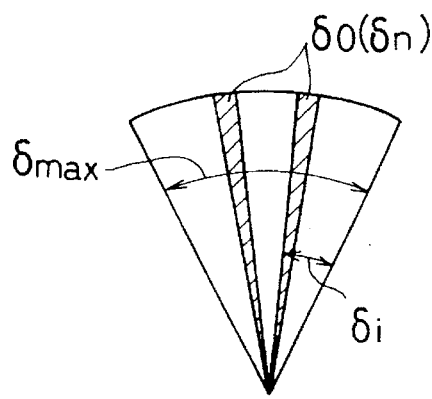
FIG. 11 is a schematic view showing a change of split zone.
Figure 11B:
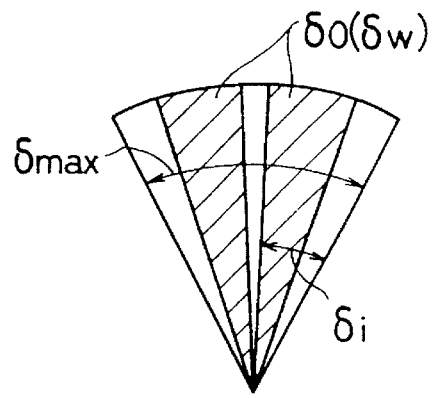

As a result, the overlapped potion is increased in the unstable driving condition of a larger yawing rate dy as shown in FIG. 11 so that the movement of the obstacle across the different small split zones can be readily monitored and therefore a responsive control for avoiding the obstacle can be accomplished.

Figure 12:
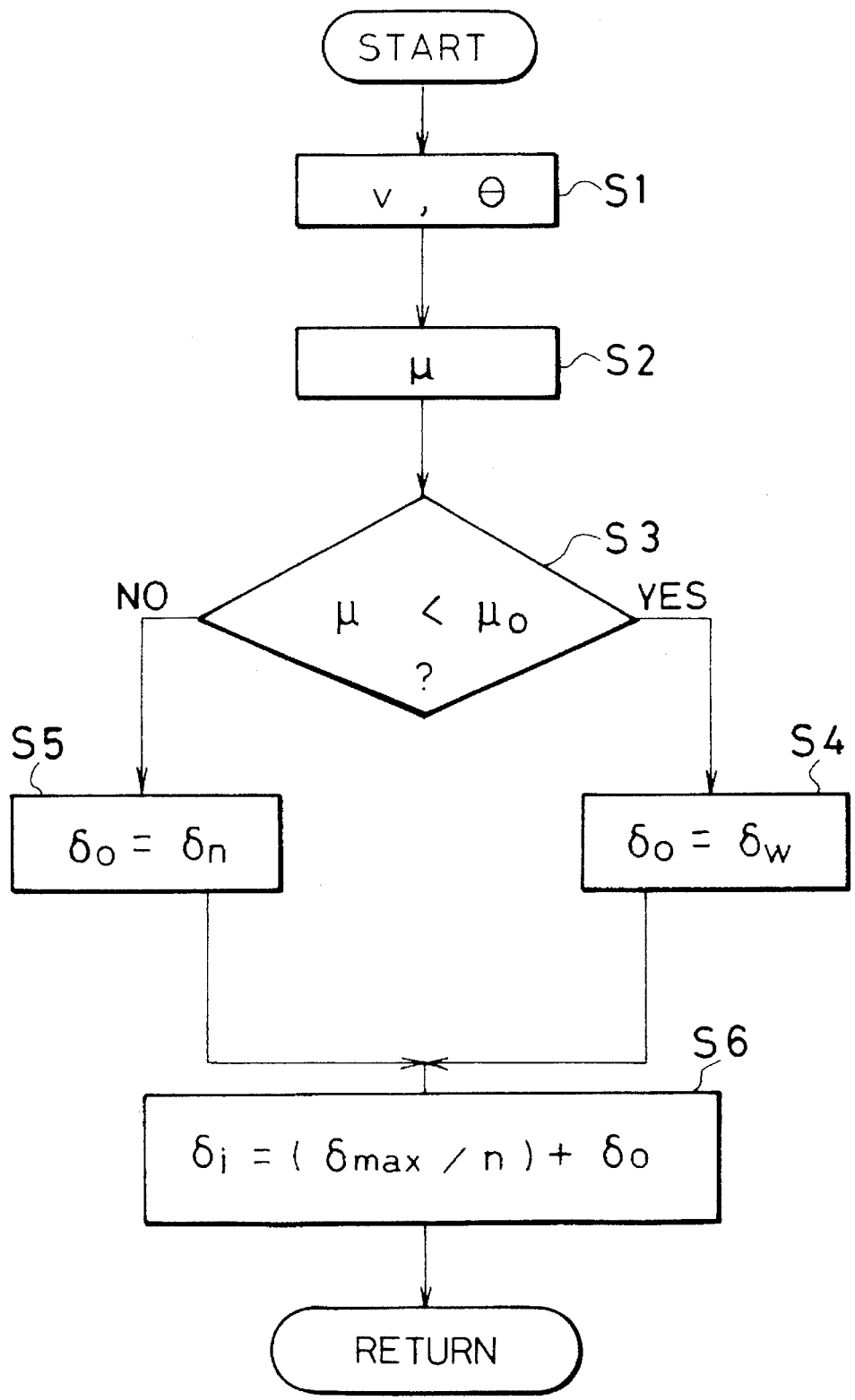
FIG. 12 is a flow chart of a routine for changing a size of an overlapped portion of the split zone in accordance with a road frictional coefficient.

Alternatively, as shown in FIG. 12, the controller 4 speculates the road frictional coefficient μ (step 2). If the coefficient μ is smaller than the predetermined value, the overlapped portion is increased (steps 3 and 4). In other modifications, the overlapped portion is also increased when a side force acting on the vehicle, slip angle of the vehicle wheel, slip ratio of the vehicle wheel, acceleration of the vehicle, and/or the steering angle is increased beyond a predetermined value.

Next, a control for changing the size of the small split zone, such as collision zone S1, S2 and S3 in accordance with the driving condition, is explained.

Referring to FIG. 13, the controller 4 receives the vehicle speed v and steering angle θ (step 1). The controller 4 determines a reference line of the detection area. Where an offset angle Φ of a moving direction Y of the vehicle 14 from a tangential line of a path and the side slip angle is β, the offset angle φ of the reference line or moving direction Y from the direction c of the vehicle is a value Φ−β (step 2, 3). Next, the controller judges whether or not the steering angle θ is greater than a predetermined value $θ_0$ (step 4). If the steering angle θ is not greater than the value θ, the controller 4 further judges whether or not the vehicle speed v is smaller than a predetermined value $v_0$ (step 5). If the vehicle speed v is not greater than the value $v_0$, the controller 4 further judges whether or not the side force acceleration α is greater than a predetermined value α (step 6). If the side force acceleration is not greater than the predetermined value $α_0$, the controller 4 further judges whether or not a change rate dθ of the steering angle is greater than the predetermined value $dθ_0$, and whether or not a ratio of the side force acceleration α to a speculated side force acceleration $α_e$ is smaller than a predetermined value Γ (step 8). The speculated side force acceleration α is expressed as follows:

$$α_0 = v^2/R$$

Wherein $R = (1 + Av^2)s(N/θ)$

A: stability factor $(m/2s^2)(s_r K_r - s_f K_f)/K_f K_r$ $(s^2/m^2)$ s: wheel base (m)

N: steering gear ratio (–)

m: vehicle weight (kg)

$s_f$: distance from the gravity center of the vehicle to the front wheels (m)

$s_r$: distance from the gravity center of the vehicle to the rear wheels (m)

$K_r$: cornering power of the rear wheels (N/radian)

$K_f$: cornering power of the front wheels (N/radian)

If either one of the above judgments is Yes, namely, if the steering angle θ is greater than the predetermined value $θ_0$, or if the vehicle speed v is smaller than the predetermined value $v_0$, or the side force acceleration α is greater than the predetermined value $α_0$, or if the steering angle change rate dθ is smaller than the predetermined value $dθ_0$ and if the ratio Γ of the side force acceleration α to the speculated side force acceleration $α_e$ is between a value 0 and 0.3, the controller 4 provides the expansion angle $δ_{s1}$ of the collision zone S1 and expansion angle $δ_{s2}$ of the close zone S2 with larger values $δ_{s1w}$ and $δ_{s2w}$ respectively (step 9). If the above condition is not established, the controller 4 provided the expansion angles $δ_{s1}$ and $δ_{s2}$ with normal values $δ_{s1n}$ and $δ_{s2n}$ respectively (step 10). In this case, if the ratio F of the side force acceleration α to the speculated side force acceleration $α_e$ is smaller than the value 0.3, it is considered that the frictional coefficient μ is small. Thus, in this case, the controller 4 may expand the collision zone S1 and close zone S2.

Figure 14A:
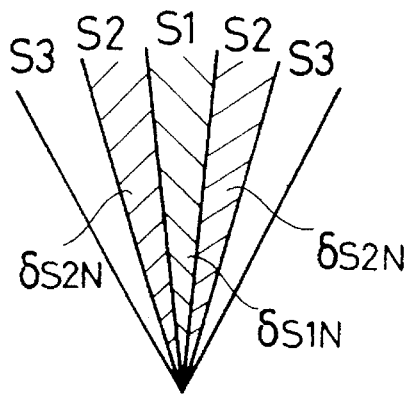
FIG. 14 is a schematic view showing a change of the specific split zone in accordance with the driving condition.
Figure 14B:
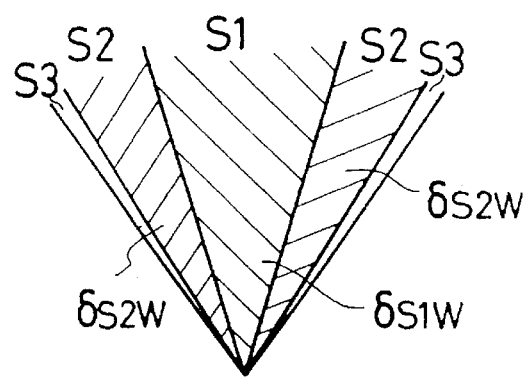

Thus, each of the small split zones has substantially the same size under the normal condition as shown in FIG. 14 (a). However, under the specific condition as aforementioned, the sizes of the small split zones are different and the collision zone S1 and close zone S2 are relatively large as shown in FIG. 14(b).

Figure 15A:
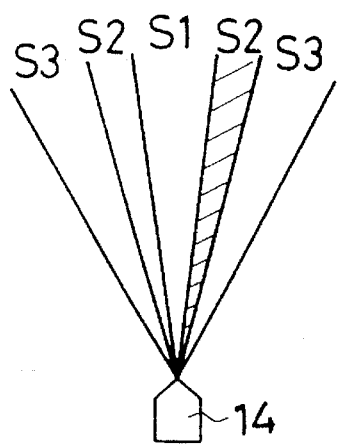
FIG. 15 is a schematic view showing another example of a change of the specific split zone in accordance with the driving condition.
Figure 15B:
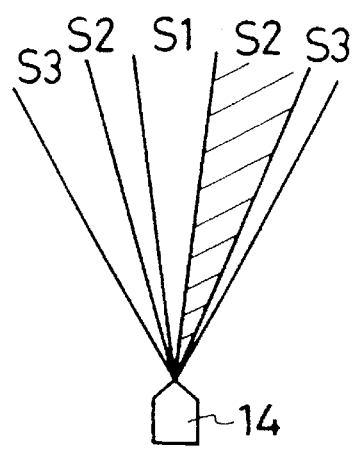

In determining the detection area, the controller 4 takes account of the offset angle φ of the reference line from the direction of the vehicle (step 11). Next, the controller 4 judges whether or not the signal from the winker is introduced (step 12). If this judgment is Yes, the controller further judges whether the signal is introduced from the left side or right side (step 13). If the signal is introduced form the right winker, it is considered that the vehicle is steered rightward. Thus, the controller 4 expands the expansion angle $δ_{s2}$ of the close zone S2 by an angle dδ (step 14). As a result, if the signal from the right winker is introduced to the controller 4, the size of the close zone S2 is expanded as shown in FIG. 15 (b). Thus, the size of the small split zone is changed taking account of the moving direction of the vehicle so that the obstacle can be properly detected. The same control is made when a signal from the left winker is introduced (step 15).

Hereinafter, there is explained another embodiment of the present invention.

In the illustrated embodiment, the vehicle 14 is running on a straight path 24. A guardrail 25 is disposed along a lane of the straight path 24. A center line 26 is drawn on the path 24 by white paint. The detection area 15 is provided forward the running vehicle 14.

A ultrasonic sensor 27 is mounted on one side of the vehicle body. The ultrasonic sensor 27 generates the ultrasonic toward the guardrail 25. The controller 4 calculates a time period between the generation of the ultrasonic and the reception of the reflected ultrasonic from the guardrail 25 to find a distance $L_1$ between the vehicle 14 and the guardrail 25.

Figure 16:
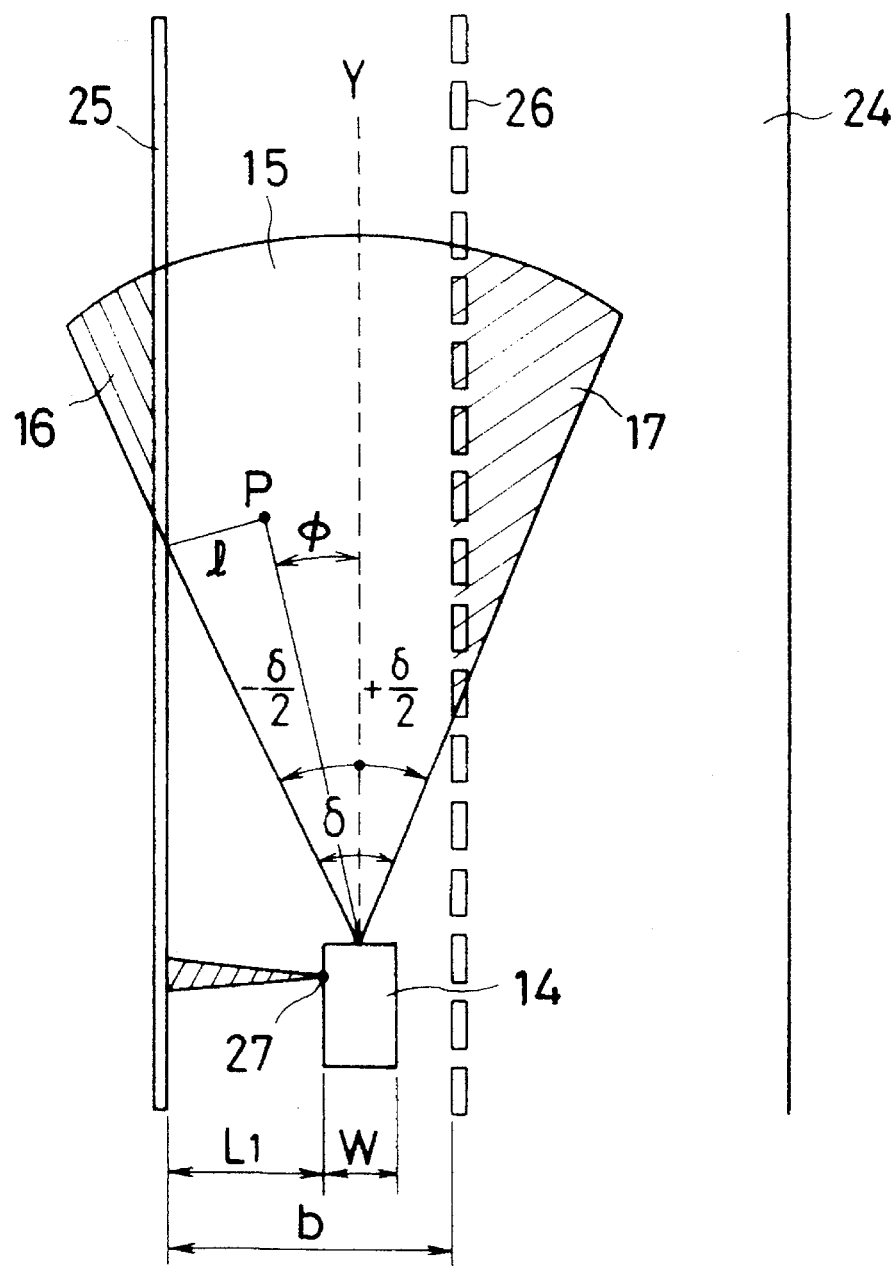
FIG. 16 is a plan view showing a detection area when the vehicle runs on a substantially straight path.

There is no need to detect an object as an obstacle outside the guardrail 25 so that the controller 4 does not count the object outside the guardrail 25 or the one in an area 16 shown by a hatched portion in FIG. 16. A point P in the detection area 15 can be expressed by a formula $-l(\sin \phi)$. The controller 4 does not take account of data detected in the area 16 outside the guardrail 25 which satisfies the following relationship:

$$-l(\sin \phi) >= L_1 + W/2$$

Wherein $0 < \phi =< -\delta/2$
W: vehicle width
(Negative sign (−) means that the point is offset from the vehicle running direction counterclockwise.)

There is also no need to detect the object in the opposite lane or an area 17 outside the centerline 26. Thus, the controller 4 does not count data detected in the area 17, which satisfy the following relationship:

$$l(\sin \phi) >= b - L_1 - W/2$$

Wherein b: lane width (for example 3.5 m).
The lane width can be previously set at a certain value. Otherwise, it can be provided by measuring a road width with an image processing. The distance $L_1$ can be also known by means of the image processing.

Figure 17:
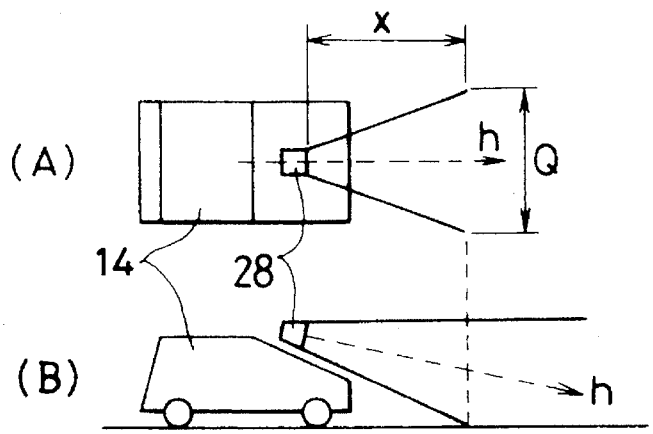
FIG. 17 is a conceptional view showing an image processing device.
Figure 18:
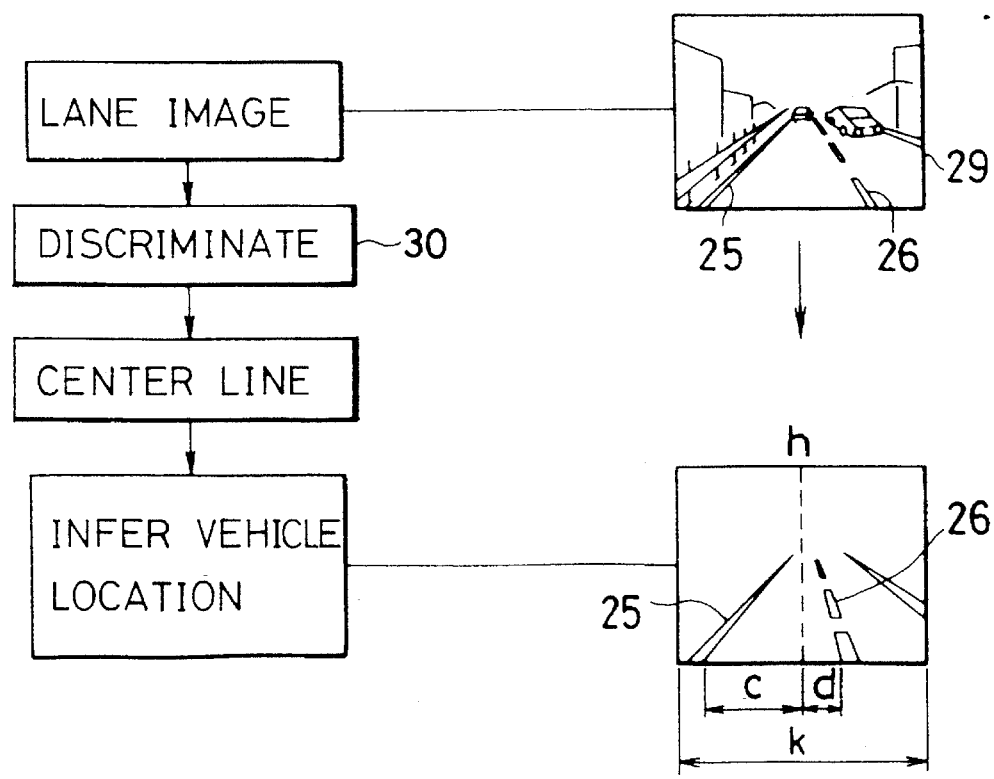
FIG. 18 is a block diagram of the image processing device.

Referring to FIGS. 17 and 18, the vehicle 14 is provided with a camera 28 on the center line thereof. The camera displays an area of width Q at the distance X forward the vehicle 14 on a screen 29. A discriminator 30 finds the location of the guardrail 25 and the center line 26 based on the color, configuration and the like. Next, the discriminator 30 calculates distances c and d from a center line h of the camera 28 to the guardrail 25 and the center line 26. The width b of the vehicle running lane is expressed by the following formula:

$$b = (c+d)Q/k$$

Wherein k: width of the screen 29.
The distance $L_1$ can be expressed by the following formula:

$$L_1 = cQ/k - W/2$$

The data $L_1$ and b obtained through the above image processing is sent to the obstacle detecting section 12 to determine the area 16 and 17 in which the object detected is not counted as the obstacle in the detection area 15.

Figure 19:
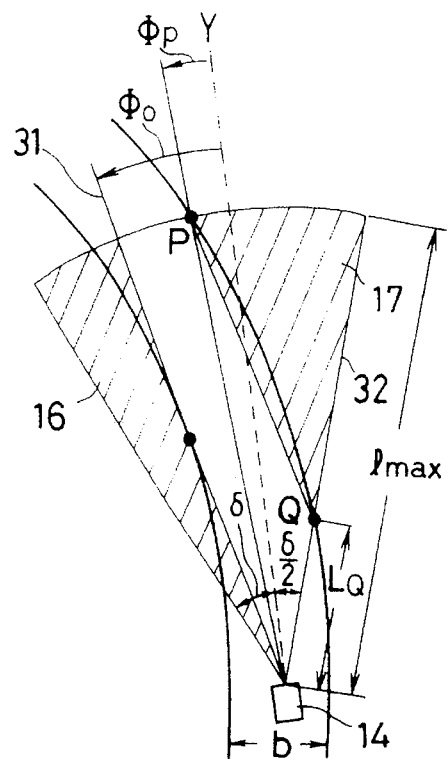
FIG. 19 is a plan view showing a detection area when the vehicle makes a left turn.

Referring to FIG. 19, there is shown a change of the detection area when the vehicle 14 is making a left turn. In this case, an area 16 outside of a beam 31 passing an inner edge point of a left curved path is less important for the driver to watch an object therein as a possible obstacle.

An angle $\Phi$ of the beam 31 offset from the moving direction Y can be expressed by the following formula:

$$\Phi_0 = (b*R)^{1/2}/R - \beta$$

Wherein b: width of the lane
R: turning radius of the vehicle
$\beta$: side slip angle of the vehicle
The controller 4 does not count the data detected in an area where satisfies the following relationship:

$$\Phi >= \Phi_0$$

Wherein $\Phi$: an offset angle of a beam of the sensor 27 from the moving direction of the vehicle.

Next, the controller 4 obtains an angle $\Phi_p$ between the maximum line $l_{max}$ of the detection area 15 passing a right edge point P of the curved path and the direction of the vehicle Y of the vehicle 14. Then, the controller 4 calculates a distance $L_Q$ to a point Q at which the right side line of the detection area 15 of the expansion angle $\delta$ crosses the right edge of the curved path. The controller 4 does not count the data detected in an area 17 outside a line passing the point P and Q since the data are considered less important.

Thus, any point within the resultant detection area 15 satisfies the following relationship when expressed by polar coordinate ($l$, $\phi$):

$$l > [(\Phi - \delta/2)l_{max} + (\Phi_P - \phi)L_Q]/(\Phi_P - \delta/2)$$

Figure 20:
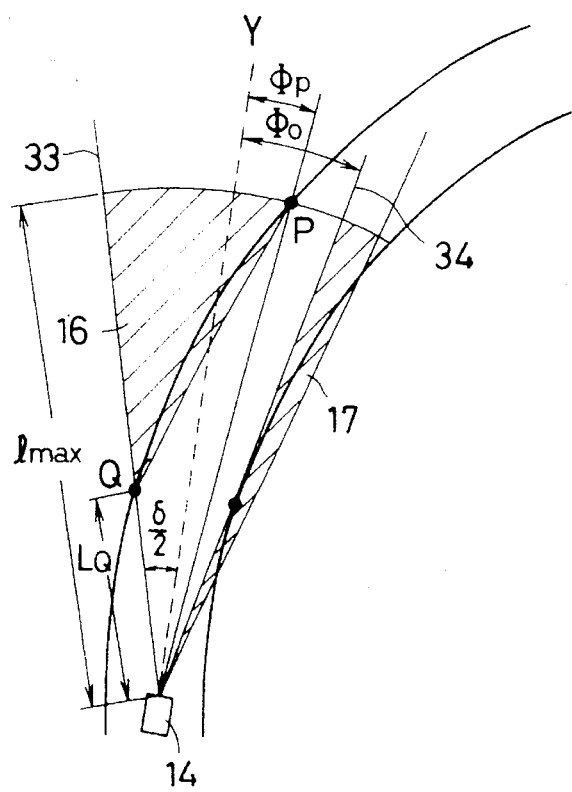
FIG. 20 is a plan view showing a detection area when the vehicle makes a right turn.

Referring to FIG. 20, there is shown a change of the detection area 15 when the vehicle is making a right turn. Likewise, the controller 4 counts only when the data are introduced from any point which satisfies the following relationship:

$$l > [(\delta/2 - \phi)l_{max} + (\phi - \Phi_P)L_Q]/(\delta/2 - \Phi_P)$$

It will be understood that as the vehicle speed v or the steering angle $\theta$ is increased, or as the turning radius R is decreased, the areas 16 and 17 become large.

Figure 21:
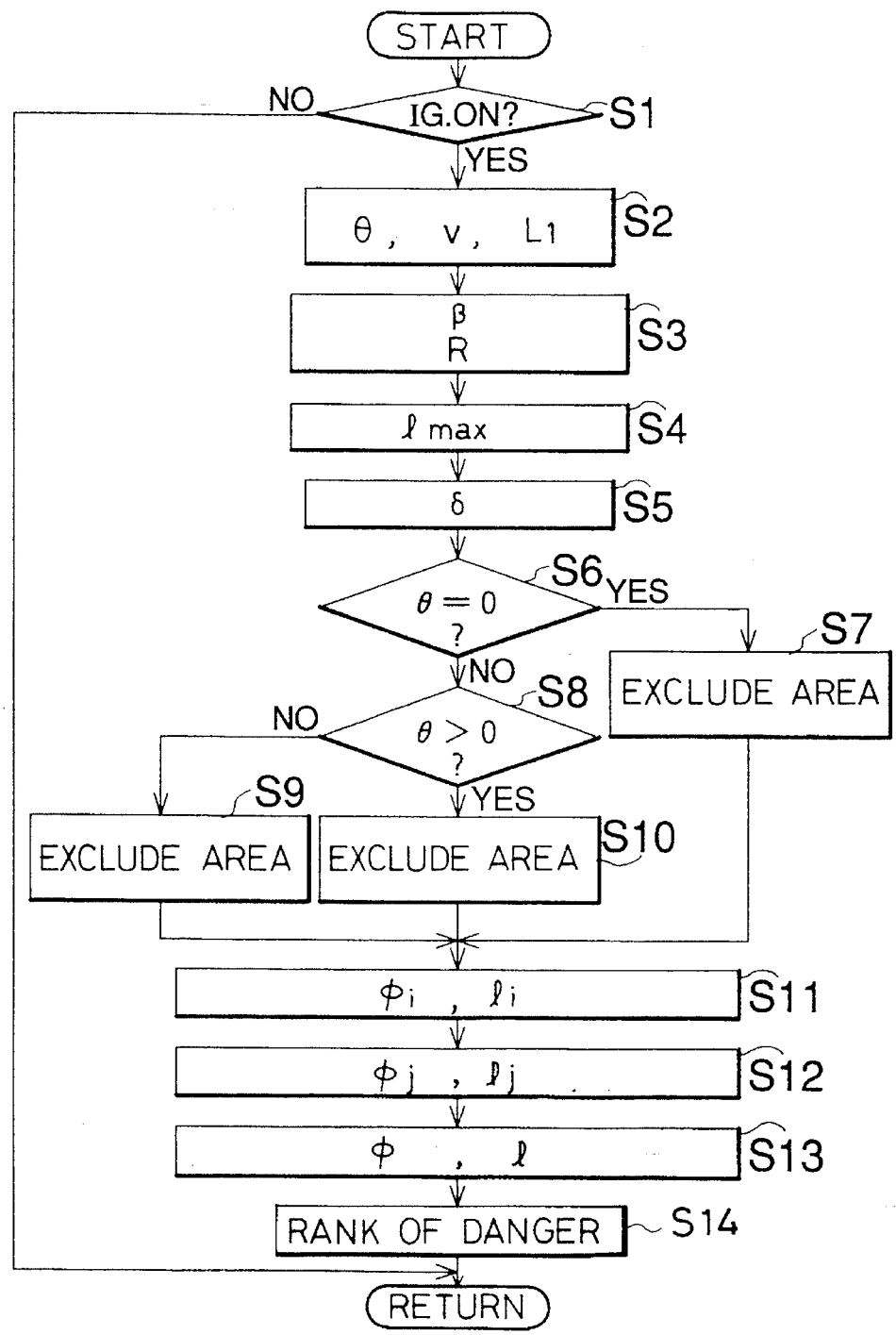
FIG. 21 is a flow chart of a routine for determining the detection area.

In FIG. 21, there is shown a procedure to calculate the areas 16 and 17.

The controller 4 judges whether or not the ignition switch is turned on (step 1). If the judgment is Yes, the controller 4 obtains the steering angle $\theta$, vehicle speed v and the distance $L_1$ from the signal ultrasonic sensor 27 (step 2). The controller 4 calculates the side slip angle $\beta$, turning radius R and the maximum distance $l_{max}$ (steps 3, 4) and determines the expansion angle $\delta$ of the detection area (step 5). Thus, the detection area 15 is established. Next, the controller 4 judges whether or not the steering angle $\theta$ is zero (step 6). If the judgment is Yes, or if the vehicle runs on a straight path, the controller determines the areas 16 and 17 in accordance with the procedure explained taking reference with FIG. 16.

If the judgment is No in step 6, the controller further judges whether or not the steering angle $\theta$ is positive (step 8). If the angle $\delta$ is positive, the vehicle is steered clockwise. Thus, if the judgment is No in step 8, the vehicle is steered counterclockwise or the vehicle is turned leftward. In this case, the controller 4 determines the areas 16 and 17 based on the procedure explained in connection with FIG. 19.

If the judgment is Yes in step 8, or if the vehicle is steered rightward, the controller 4 determines the areas 16 and 17 based on the procedure explained in connection with FIG. 20 (step 10). Then, the controller 4 detects a direction $\Phi_i$ and a distance $l_i$ for each of the obstacle in the detection area 15 (including the areas 16 and 17) (step 11). Thereafter, the controller 4 selects obstacles defined by a direction $\Phi_j$ and a distance $l_j$ within the detection area 15 (excluding the areas 16 and 17) (step 12). Finally, the controller 4 finds the closest one ($\phi$, l) among the obstacles ($\Phi_j$, $l_j$) (step 13).

According to the illustrated embodiment, only true obstacles can be properly detected.

Although the present invention has been explained with reference to specific, preferred embodiments, one of ordinary skill in the art will recognize that modifications and improvements can be made while remaining within the scope and spirit of the present invention. The scope of the present invention is determined solely by the appended claims.

What is claimed is:

1. An obstacle detection device for a vehicle comprising:

area determining means for determining a detection area extended forward of a running vehicle for detecting an obstacle, split means for splitting the detection area into a plurality of small split zones, detecting means for detecting an obstacle for each of the small split zones produced by splitting the detection area, judging means for judging a degree of danger of the obstacle in the detection area based on a relationship between said obstacle and the running vehicle, and control means for controlling the vehicle based on said degree of danger.

2. A device as recited in claim 1 and further comprising ranking means for ranking obstacles detected and the split zones.

3. A device as recited in claim 2 wherein the judging means judges the degree of danger of each of the obstacles based on its rank and the small split zone in which the obstacle belongs.

4. A device as recited in claim 1, wherein the control means comprises means for producing an alarm.

5. A device as recited in claim 1 wherein the control means includes means for producing alarm signal and means for taking an automatic braking action based on the judgment made by the judging means.

6. A device as recited in claim 1 wherein adjacent small split zones partly overlap each other.

7. A device as recited in claim 1 wherein the detecting means is constituted by a single scanning laser sensor.

8. A device as recited in claim 7 wherein the area determining means determines the detection area within the scanning area scanned by the laser sensor in processing a signal from the laser sensor.

9. A device as recited in claim 1 wherein the detecting means is constituted by an ultrasonic scan sensor.

10. An obstacle detection device for a vehicle comprising:

area determining means for determining a detection area extended forward of a running vehicle, detecting means for detecting an obstacle in the detection area, inferring means for inferring a path of the vehicle detected, by the detecting means, in the detection area, excluding means for excluding data concerning said obstacle when said obstacle is located in a predetermined part of the detection area, judging means for judging a degree of danger of the obstacle in the detection area, and control means for controlling the vehicle based on said degree of danger.

11. A device as recited in claim 10 and further comprising distance detecting means for detecting a distance between the vehicle and an installation by a road.

12. A device as recited in claim 11 wherein the predetermined part is determined in accordance with the distance.

13. A device as recited in claim 10 wherein a lane opposite to a running lane of the vehicle is designated as the predetermined part when the vehicle runs on a substantially straight path.

14. A device as recited in claim 10 wherein, when the vehicle runs on a curved path, an area beyond an outer edge of the path in a radial direction of turning is designated as the predetermined part.

15. A device as recited in claim 10, wherein the control means comprises means for producing an alarm.

16. A device as recited in claim 10, wherein the control means comprises means for producing an alarm and means for providing a braking action based on said degree of danger.

* * * * *